United States Patent
Balini et al.

(10) Patent No.: US 12,377,688 B2
(45) Date of Patent: Aug. 5, 2025

(54) TYRE FOR VEHICLE WHEELS

(71) Applicant: Pirelli Tyre S.p.A., Milan (IT)

(72) Inventors: Alfredo Balini, Milan (IT); Guido Carlo Carosio, Milan (IT); Thomas Hanel, Milan (IT); Cristiano Puppi, Milan (IT); Luigia Rossiello, Milan (IT); Marco Pozzoli, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 1126 days.

(21) Appl. No.: 15/734,506

(22) PCT Filed: Jun. 10, 2019

(86) PCT No.: PCT/IB2019/054812
§ 371 (c)(1),
(2) Date: Dec. 2, 2020

(87) PCT Pub. No.: WO2019/239282
PCT Pub. Date: Dec. 19, 2019

(65) Prior Publication Data
US 2021/0229505 A1    Jul. 29, 2021

(30) Foreign Application Priority Data
Jun. 11, 2018    (IT) .................. 102018000006206

(51) Int. Cl.
*B60C 13/00*    (2006.01)
*B60C 1/00*    (2006.01)
(Continued)

(52) U.S. Cl.
CPC .......... *B60C 13/001* (2013.01); *B60C 1/0025* (2013.01); *G09F 3/02* (2013.01);
(Continued)

(58) Field of Classification Search
CPC ... B60C 13/04; B60C 13/00; B60C 2013/006; B60C 13/001; B60C 13/002;
(Continued)

(56) References Cited

U.S. PATENT DOCUMENTS 5,380,391 A * 1/1995 Mahn, Jr. .............. B60C 13/001
8,088,481 B2 * 1/2012 Tabata ..................... C09J 7/387
428/40.1
(Continued)

FOREIGN PATENT DOCUMENTS

EP    0 861 742 A2 *  9/1998
EP    1168282 A1    1/2002
(Continued)

OTHER PUBLICATIONS

English machine translation of EP 0 861 742 A2, Sep. 2, 1998.*
(Continued)

*Primary Examiner* — Scott R. Walshon
(74) *Attorney, Agent, or Firm* — Finnegan, Henderson, Farabow, Garrett & Dunner, L.L.P.

(57) ABSTRACT

The present disclosure relates to a tyre (100) for vehicle wheels comprising at least one carcass structure (101), a tread band (109) applied in a position radially external to said carcass structure, and a pair of sidewalls (108) applied laterally on the opposite sides with respect to said carcass structure, where on at least one sidewall of said pair of sidewalls (108), a label (120) is applied comprising a protective layer (121), an adhesive layer (123), and possibly one or more ink layers (122) interposed between said protective layer (121) and said adhesive layer (123), where said adhesive layer (123) adheres the label (120) to the surface of said sidewall, where said protective layer (121) comprises polyester-based and/or polyether-based cross-linked aliphatic polyurethanes exhibiting dynamic elastic
(Continued)

modulus values E', measured at 25° C., static tensile deformation 1%, dynamic deformation ±0.1%, and frequency 1 Hz, equal to or higher than about 5 MPa, and a residual deformation measured at 25° C. after 4 cycles of deformation from 0% to 12%, equal to or lower than about 1%.

19 Claims, 2 Drawing Sheets

(51) Int. Cl.
| | | |
|---|---|---|
| | *C09D 175/06* | (2006.01) |
| | *C09D 175/08* | (2006.01) |
| | *G09F 3/02* | (2006.01) |
| | *C08G 18/42* | (2006.01) |

(52) U.S. Cl.
CPC ............ *B60C 13/002* (2013.01); *C08G 18/42* (2013.01); *C09D 175/06* (2013.01); *C09D 175/08* (2013.01); *C09J 2475/006* (2013.01); *G09F 2003/0241* (2013.01); *G09F 2003/0257* (2013.01)

(58) Field of Classification Search
CPC ... B60C 1/0025; B29D 2030/728; G09F 3/02; G09F 2003/0257; C08G 18/42; C08G 18/4211; C08G 18/4854; C08G 18/73; C08G 18/751; C08G 18/76; C08G 2380/00; C09D 175/08; C09J 175/04; C09J 175/06; C09J 115/00; C09J 107/00; C09J 2475/006

See application file for complete search history.

(56) References Cited

U.S. PATENT DOCUMENTS

| | | |
|---|---|---|
| 2002/0028311 A1 | 3/2002 | Coppens et al. |
| 2003/0104309 A1 | 6/2003 | Koops et al. |
| 2004/0103974 A1* | 6/2004 | Majumdar ............ B60C 13/001 152/524 X |
| 2006/0029764 A1 | 2/2006 | Coppens et al. |
| 2010/0092716 A1 | 4/2010 | Spychalsky |
| 2016/0121661 A1* | 5/2016 | Oshikane ................ B60C 13/04 152/524 |
| 2017/0225520 A1* | 8/2017 | Mizotani ............... B60C 13/001 |
| 2017/0240002 A1* | 8/2017 | Mizotani ................. B60C 13/04 |
| 2017/0283658 A1 | 10/2017 | Tanaka |
| 2018/0030248 A1* | 2/2018 | Hatano ...................... C08L 9/00 |
| 2018/0079886 A1* | 3/2018 | Kaiser ...................... C08K 3/26 |

FOREIGN PATENT DOCUMENTS

| | | | |
|---|---|---|---|
| EP | 3225670 A1 | 10/2017 | |
| WO | WO-9814338 A1 * | 4/1998 | ............. B41M 1/32 |
| WO | WO 03035411 A2 | 5/2003 | |

OTHER PUBLICATIONS

"Chemglaze", webpage for Socomore Group disclosing purchase of Chemglaze aliphatic polyurethane coating from Lord Corporation in 2016.*
Machine translation of WO-98/14338A1 (Year: 2024).*
International Search Report form the European Patent Office in corresponding International Application No. PCT/IB2019/054812 mailed Nov. 6, 2019.
Written Opinion of the International Searching Authority from the European Patent Office in corresponding International Application No. PCT/IB2019/054812 mailed Nov. 6, 2019.

* cited by examiner

TYRE FOR VEHICLE WHEELS

This application is a national stage entry application under 35 U.S.C. § 371 of International Application No. PCT/IB2019/054812, filed on Jun. 10, 2019, and claims priority to Italian Application No. 102018000006206, filed Jun. 11, 2018; the contents of each application is incorporated herein by reference in its entirety.

The present invention relates to a tyre for vehicle wheels comprising a label pre-printed on an outer protective film adhered on at least one side of said tyre by means of an adhesive layer.

PRIOR ART

Tyres for vehicle wheels commonly have information and indicative signs made on the sidewalls of the tyre. This information and indicative signs are generally represented by the manufacturer's mark, the tyre model, and alphanumeric codes that provide information on the size and use of the tyre. These indices are typically formed directly in the rubber sidewall during the tyre moulding and vulcanisation process and are generally in relief and black in colour.

After the vulcanisation, coloured labels may also be applied on the sidewalls of tyres for vehicle wheel, such as, for example, strips, writings, logos, decals, bar codes and the like.

The adhesion of the label to the sidewall is obtained using a suitable adhesive.

However, due to the repeated cyclic deformation of the tyre sidewall and the temperature changes that occur during the use of the tyre, the labels known in the art generally tend to detach and fall due to inadequate adhesion.

Moreover, if during use the sidewall of the tyre comes into contact with a kerb, a sidewalk or other abrasive surfaces, the labels tend to scratch and ruin easily. Similar phenomena of detachment and scratching may occur during car washing due to the combined action of water and detergents with abrasive agents (brushes and/or sponges).

Finally, the coloured labels known in the art are subject to alterations due on the one hand to exposure to atmospheric agents (such as ozone, for example) and on the other to the migration of chemical compounds introduced into the tyre compound (such as waxes, polymeric and antioxidant protective agents).

SUMMARY OF THE INVENTION

The Applicant has tackled the problem of implementing a label which, once applied to the sidewall of a tyre, is capable of withstanding deformation cycles and temperature changes, chemical agents from the environment, repeated washing operations and the impacts of the tyre sidewall with abrasive surfaces.

The Applicant has considered that the scratch resistance could be solved through the use of a label made by depositing an ink layer on a pre-existing transparent protective layer.

The Applicant has also considered that the protective layer could be coloured during production by incorporation of a suitable pigment, thus avoiding the subsequent deposition of the ink layer.

The Applicant has also considered that the label could be applied to the tyre sidewall by means of an adhesive layer deposited on the ink layer or directly on the protective layer.

The Applicant has therefore considered to produce a label comprising a protective layer, transparent or coloured, to impart protection from abrasion and external agents, and an adhesive layer for application to the sidewall of the tyre, and possibly an ink layer interposed between the protective layer and the adhesive layer.

Based on the Applicant's experience, certain mechanical features of elasticity and elongation of the protective layer were required in order to obtain the desired strength and duration for use on the sidewall of a tyre.

Resistance to fatigue and operating temperature are also conditions to be considered for use on the sidewall of a tyre.

In order to carry out the printing on the surface of the protective layer, the choice of inks led to the implementation of an interface resistant to mechanical stresses and capable of maintaining the intensity of the colour over time by counteracting discolouration processes due to the effect of light and/or oxidising agents.

Furthermore, sufficient adhesive strength and at the same time a certain elasticity were required to the adhesive layer, capable of counteracting high stresses resulting from deformation cycles during use of the tyre in order to reduce the occurrence of breakage/cracking of the printed layer.

In view of the foregoing, the Applicant initially tried to carry out the printing of different types of inks on a series of protective layers, subsequently using different types of adhesive.

Finally, after extensive studies concerning the protective layer, the Applicant has surprisingly found that a good resistance to abrasion and at the same time a good mechanical strength and flexibility could be obtained by using a protective layer made of cross-linked polymers with reduced thermoplasticity, such as for example, polyester or polyether-based polyurethane films.

The Applicant has also found that with modulus and elasticity values comparable or superior to those of the tyre sidewall, the material of the protective layer could effectively withstand the stresses caused by the rolling of the tyre during use.

During the studies, the Applicant has also found that protective layers with particularly good results in terms of abrasion resistance and flexibility could be obtained with polymeric materials comprising cross-linked aliphatic polyurethanes based on polyester or polyether. These materials made it possible to produce a label comprising a protective layer printed with one or more layers of ink and with a layer of adhesive, capable of being applied to the sidewall of a tyre and capable of effectively withstanding the stresses deriving from the use of the tyre itself. At the same time, the Applicant has also found that such materials allowed coloured labels to be obtained by incorporation of a coloured pigment during their production.

After extensive studies concerning the adhesive layer, the Applicant also found that good adhesion results could be obtained with pressure sensitive adhesives (PSA) and thermally activatable adhesives (TA—Thermo Adhesives).

During the studies, the Applicant has also found that particularly good results in terms of adhesion strength could be obtained with thermally activatable adhesives comprising a mixture comprising (i) natural or synthetic rubber, optionally functionalised with carboxyl or epoxy groups, (ii) block copolymers of the ABA type, and optionally (iii) urethane rubber. These adhesives made it possible to produce a label comprising a protective layer printed with one or more layers of ink and with a layer of adhesive, capable of being applied to the sidewall of a tyre and capable of effectively withstanding the stresses deriving from the use of the tyre itself, using adhesive layers of reduced thickness.

Therefore, the present invention relates in general to a tyre for vehicle wheels comprising at least one carcass structure, a tread band applied in a position radially external to said carcass structure, and a pair of sidewalls applied laterally on the opposite sides with respect to said carcass structure, where a label is applied on at least one sidewall of said pair of sidewalls, said label comprising a protective layer, an adhesive layer, and possibly one or more ink layers interposed between said protective layer and said adhesive layer, where said adhesive layer adheres the label to the surface of said sidewall.

More in particular, the present invention relates to a tyre for vehicle wheels comprising at least one carcass structure, a tread band applied in a position radially external to said carcass structure, and a pair of sidewalls applied laterally on the opposite sides with respect to said carcass structure, where on at least one sidewall of said pair of sidewalls, a label is applied comprising a protective layer, an adhesive layer, and possibly one or more ink layers interposed between said protective layer and said adhesive layer, where said adhesive layer adheres the label to the surface of said sidewall, where said protective layer comprises polyester-based and/or polyether-based cross-linked aliphatic polyurethanes characterised by dynamic elastic modulus values E', measured at 25° C., static tensile deformation 1%, dynamic deformation ±0.1%, and frequency 1 Hz, equal to or higher than 5 MPa, with a residual deformation measured at 25° C. after 4 cycles of deformation from 0% to 12%, equal to or lower than 1%.

The polyurethanes are produced by reaction between an isocyanate and a polyol in the presence of catalysts to increase the reaction rate.

The term "isocyanate" means any organic compound that has two or more groups of reactive isocyanate (—NCO) in a single molecule that can be aliphatic, alicyclic, aromatic, or mixtures thereof. The present definition includes diisocyanates, triisocyanates, tetraisocyanates or mixtures thereof. It is preferable to use diisocyanates. These isocyanate groups may be linked to aromatic, aliphatic, or cycloaliphatic groups.

Examples of aliphatic diisocyanate compounds include 1,2-ethylene diisocyanate, 1,3-propylene diisocyanate, 1,4-butane diisocyanate and 1,6-hexamethylene diisocyanate.

Examples of alicyclic diisocyanate compounds include 1,4-cyclohexane diisocyanate and 4,4-cyclohexane diisocyanate.

These diisocyanate compounds may be used alone or in combination with 2 or more types of compounds.

Examples of commercially available diisocyanate compounds include, inter alia, those selected from the group consisting of bis(4-isocyanatecyclohexyl)methane (H12 MDI, available from Bayer Corp.), diphenylmethane diisocyanate (MDI, available from Bayer Corp.) and diphenylmethane diisocyanate (MDI, available from Bayer Corp.), isophorone diisocyanate (IPDI, available from Huels America), 2,4-toluene diisocyanate (TDI, available from Aldrich Chemical Co.), hexamethylene diisocyanate (HDI, available from Aldrich Chemical Co.), m-tetramethylxylene diisocyanate (TMXDI, available from Aldrich Chemical Co.), 1,3-phenylene diisocyanate.

The term "polyol" refers to polyhydric alcohols containing two or more hydroxy groups. The polyol preferably has a hydroxyl functionality of 2-4 (i.e. diols, triols, tetraols). More preferably, the polyol is a diol, although higher functional polyols such as, for example, triols or tetrols, may be used in combination with a diol. The polyol is preferably a diol or a mixture of diols.

Examples of aliphatic diol compounds include glycols and polyalkylene glycols and, for example, ethylene glycol, propylene glycol, trimethylene glycol, 1,4-butanediol, 1,3-butanediol, 1,5-pentanediol, 1,6-hexane, 1,7-heptane diol, 1,8-octanediol, 1,9-nonanediol and 1,10-decanediol.

Examples of alicyclic diol compounds include cyclopentan-1,2-diol, cyclohexan-1,2-diol, cyclohexan-1,3-diol, cyclohexan-1,4-diol and cyclohexan-1,4-dimethanol.

These diol compounds may be used alone or in combination with two or more diol compounds.

The polyol may be a polyester (also known as polyesterol) consisting of polycondensation of carbonic acid, caprolactone or multifunctional carboxylic acids and polyhydroxy compounds such as, for example, the reaction product of adipic acid and neopentyl glycol or phthalic anhydride and hexanediol or carbonic acid and ethylene glycol; a polyether (also known as polyetherol) consisting of the reaction of epoxides with polyhydroxy active compounds containing hydrogen, such as, for example, polytetramethylene glycol or polypropylene glycol; or mixtures of these substances.

Examples of multifunctional carboxylic acids useful in the preparation of polyesterols are polyfunctional carboxylic acids having 2 to 12 carbon atoms, such as, for example, succinic acid, glutaric acid, adipic acid, suberic acid, azelaic acid, sebacic acid, decanedicarboxylic acid, maleic acid, fumaric acid and, preferably, phthalic acid, isophthalic acid, terephthalic acid and naphthalene dicarboxylic acids.

Examples of epoxides useful in the preparation of polyetherols are alkylene oxides having 2 to 6 carbon atoms, such as, for example, ethylene oxide, propylene oxide, epichlorohydrin, butylene oxide, and tetrahydrofuran.

The polyesterols obtained by esterification of carbonic acid, caprolactone, dicarboxylic acids and glycols can be derived from known esterification or transesterification processes, as described, for example, in the article D. M. Young, F. Hostettler et al., "Polyesters from Lactone", Union Carbide F-40, p. 147. Useful examples of polyesterols are the esterification products of adipic acid or caprolactone with glycols from two to ten carbon atoms, such as for example 1,6 hexanediol adipate, 1,10-decanediol adipate, and 1,10-decanediol caprolactone.

The catalyst used for the preparation of polyurethanes is preferably, but not exclusively, an amine catalyst, an organo-metallic catalyst or a mixture of such catalysts. Such an amine catalyst is preferably, but not limited to, triethylamine, tributylamine, triethylenediamine, N-ethyl morpholine, N,N',N'-tetramethyl ethylamine, pentamethyldiethylenetriamine, N,N-methylaniline, N,N-dimethylaniline, or a mixture thereof. Said organo-metallic catalyst is preferably, but not limited to, an organic tin compound, for example: tin(II) acetate, tin(II) octylate, tin ethyl hexanoate, tin laurate, tin dibutyl oxide, dibutyl dichloride, dibutyl tin diacetate, dibutyl tin maleate, dioctyl tin diacetate or a mixture of such elements.

Thermally activatable catalysts allow the application of the polyurethane system components and rapid polymerization at high temperatures. Thermally activatable catalysts are known and comprise for example acid-blockers, for example amine catalysts blocked with carboxylic and especially formic acid, such as tertiary amine catalysts, N-acetylated amine catalysts. These are obtainable for example by reaction of acids with bases, in the presence or absence of a solvent. These catalysts are known and are described for example in U.S. Pat. Nos. 4,582,861, 4,232,152, 4,366,084, 4,450,246, 4,617,286, DE19512480, EP0989146, U.S. Pat. Nos. 6,525,107, 5,770,635.

In the production of polyurethanes it is possible to consider the presence of chain extenders and cross-linkers.

Chain extenders are low molecular weight diols and diamines. The cross-linkers are high functionality polyols and amines (functionality greater than 2) which act as cross-linkers between the portion consisting of the segments of polyesterol or polyetherol and the portion consisting of the segments of the polyurethane system (isocyanate). Cross-linking of a polyurethane system provides the desirable physical properties such as elasticity, tensile strength, tear resistance and elongation.

For the purposes of the invention, films are preferentially considered for the protective layer obtained by spreading two-component mixtures based on pre-polymer isocyanate and polyol which by addition reaction lead to the formation of a cross-linked film.

Cross-linked polyurethanes are preferred because they have greater elasticity and lower permanent deformation due to stresses, in particular under thermal conditions.

In particular, for the purposes of the present invention, polyurethanes with dynamic elastic modulus values E' are preferably used, measured at 25° C., with 1% static deformation in traction, dynamic deformation ±0.1%, and frequency 1 Hz, equal to or greater than 5 MPa, and with a residual deformation, measured at 25° C. after 4 deformation cycles of from 0% to 12%, equal to or less than about 1%, preferably equal to or less than about 0.5%.

Preferably, the polyurethanes used in the present invention have dynamic elastic modulus values equal to or less than about 25 MPa, more preferably equal to or less than about 20 MPa.

Advantageously, the thickness of the protective layer is in the range from about 20 to about 300 μm, preferably from about 50 to about 200 μm, and even more preferably from about 75 to about 150 μm. For example, the thickness of the protective layer may be about 100 μm.

If the thickness of the protective layer is less than 20 μm, the abrasion resistance may be insufficient to impart a duration compatible with the life of the tyre. If the thickness of the protective layer is greater than 300 μm, a greater thickness of the adhesive layer may be required accordingly, and the weight and the overall thickness of the label could cause greater ease of detachment.

For the purposes of the present invention, the protective layer may advantageously be made with a transparent or coloured polyurethane film.

The term "transparent" is used according to its ordinary meaning. In some embodiments, it is used to refer to a material or layer that is capable of transmitting at least 50% of the intensity of visible light incident thereon, measured along a normal axis. In some embodiments, the protective layer has a transmissibility greater than 70%, in some embodiments greater than 80%, and in some embodiments greater than 90%.

The term "coloured" is used according to its ordinary meaning to include any colour of the visible spectrum, including white and black, in any shade and intensity. In some embodiments, it is used to refer to a material or layer that is still capable of transmitting up to 50% of the intensity of visible light incident thereon, measured along a normal axis. In some embodiments, the protective layer has a transmissibility of less than 30%, in some embodiments greater less 20%, and in some embodiments less than 10%.

Advantageously, the protective layer may be made with a coloured polyurethane film made during the production of the polyurethane by the addition of a suitable colouring pigment. The pigment content may range between about 1% and about 30% by weight, preferably between about 3% and about 20% by weight, with respect to the overall weight of the protective layer. The pigment is preferably contained in amounts of about 2%, 4%, 5%, 6%, 7%, 8%, 9%, 10%, 11%, 12%, 13%, 14%, 15%, 16%, 17%, 18% and 19% by weight, with respect to the overall weight of the protective layer.

The colouring pigments may be organic or inorganic compounds, natural or synthetic, which may be used separately or in combination. Titanium dioxide is a common white pigment with a high refractive index and covering power. It is often used with both organic and inorganic coloured pigments. Iron oxides have a colour ranging from yellow to red, from brown to black. Other inorganic colouring pigments are chromium oxide green, phthalocyanine green, phthalocyanitrile blue, ultramarine blue, and cadmium red. Azo pigments are a common class of organic colouring pigments.

Specific examples of polyurethane film useful for the protective layer of the present invention and commercially available are the transparent or coloured polyurethane films made by the company NTT SrI, Fagnano Olona (Italy) under the trade name X-SIDE01, X-SIDE02 (containing 5% in weight of $TiO_2$) and X-SIDE03 (containing 10% by weight of $TiO_2$).

The material of the ink layer possibly interposed between the protective layer and the adhesive layer is not particularly limited and may comprise any type of ink capable of being printed on polymeric material by means of silk-screen printing, digital printing, flexographic printing and/or pad printing.

The printing technique and the ink composition is to be identified according to the composition of the protective layer on which the printing is carried out, so that the ink layer is adhered consistently to avoid delamination phenomena during the tyre's working phase in dynamic in the relative temperature range A printing ink essentially consists of a dye or pigment and filler substances, such as binder, solvent and additives.

The pigments may be inorganic or organic and therefore synthetic, and may be the same as those described above in relation to their use in the protective layer. The binder may comprise a resin which can be polyester, alkyd or rosin. The additives are slipping agents, desiccants and antioxidant agents, the latter useful for avoiding by oxidation the drying of the ink before being used.

On average, an ink may be formed using: coloured pigment, generally from 10 to 20%, white covering pigment (titanium dioxide) from 20 to 50%; alkyd resins (plants from flax, soy, etc.) from 10 to 15%; hard resins (from rosin) from 25 to 30%; mineral or vegetable oils from 30 to 35%, waxes about 5%; desiccants from 1 to 2% and anti-drying agents from 1 to 2%.

The filler substances generally do not influence the colour tone and are used to give the ink a greater consistency: therefore, each type of print will have its own type of ink and therefore will have different fillers. Generally they are mineral (inorganic) or synthetic (organic) products.

Based on the fillers, transparent or covering inks are obtained (especially for white), bright or opaque with different fluidity or viscosity, depending on the type of printing considered for their application.

Advantageously, the thickness of the ink layer is in the range from about 1 to about 100 μm, preferably from about 5 to about 50 μm, and even more preferably from about 5 to about 20 μm. For example, the thickness of the protective layer may be about 10 μm.

Examples of commercially available inks useful for the purposes of the present invention are polyurethane-based inks such as Nylontech™ inks by the company Grafco SrI, Treviso (Italy), in particular Nylontech™ HP and Nylontech™ PLT inks.

The adhesive layer material includes pressure sensitive adhesives (PSA) and thermally activatable adhesives, hereinafter also thermo adhesives (TA). These comprise adhesives based on natural or synthetic rubber, acrylic adhesives, vinyl ether adhesives, silicone adhesives, urethane-based adhesives, and mixtures of two or more of them. The adhesives may be in the form of hot melt adhesives, solution or emulsion.

In particular, for the purposes of the present invention, adhesives are preferably used with an adhesion force, measured according to the ISO 11339 standard on superficially untreated PET at a temperature of 23° C., equal to or greater than about 2N, preferably equal to or greater than about 4N, more preferably equal or greater than 1 ON.

Advantageously, the thickness of the adhesive layer is in the range from about 5 to about 400 μm, preferably from about 20 to about 200 μm, and even more preferably from about 35 to about 100 μm. For example, the thickness of the protective layer may be about 60 μm.

The pressure-sensitive or thermally activatable adhesive materials may contain an adhesive polymer such as acrylic-type polymers as the main constituent; block copolymers; natural, regenerated or styrene-butadiene rubbers; natural or synthetic adhesive rubber; or ethylene and vinyl acetate copolymers, ethylene-vinyl-acrylic terpolymers, polyisobutylene, poly(vinyl ether), etc. Other materials in addition to the above resins may be included in pressure-sensitive or thermally activatable adhesive compositions. These include solid adhesive resins, antioxidants, fillers, pigments, waxes, etc. Plasticisers (such as paraffinic or aromatic or naphthenic oil) are also included.

The pressure-sensitive adhesive compositions are preferably adhesive compositions containing a mixture of acrylic monomers as an essential component.

Among the preferred examples of acrylic monomer are alkyl(meth)acrylates with (linear or branched) alkyl chain of from 2 to 18 carbon atoms, more preferably from 2 to 12 carbon atoms, and even more preferably from 2 to 10 carbon atoms. As used herein, the term "(meth)acrylate" refers to "acrylate" and/or "methacrylate".

Examples of alkyl(meth)acrylates include ethyl(meth) acrylate, n-propyl(meth)acrylate, isopropyl(meth)acrylate, n-butyl(meth)acrylate, isobutyl(meth)acrylate, t-butyl(meth) acrylate, n-octyl(meth)acrylate, isooctyl(meth)acrylate, 2-ethylhexyl(meth)acrylate, isononoyl(meth)acrylate, dodecyl(meth)acrylate and isostearyl(meth)acrylate. Each of the different alkyl(meth)acrylates may be used alone or in combination. Among these, alkyl(meth)acrylates with an alkyl chain of 4 to 9 carbon atoms are particularly preferred, such as 2-ethylhexyl(meth)acrylate, n-butyl(meth)acrylate, n-octyl(meth)acrylate, isooctyl(meth)acrylate and isonylsil (meth)acrylate.

The mixture of acrylic monomers preferably contains alkyl(meth)acrylates with an alkyl chain of 2 to 18 carbon atoms as the main component. Although not critical, the content of alkyl(meth)acrylate with alkyl chain of from 2 to 18 carbon atoms in the acrylic monomeric mixture is preferably equal to or greater than 50% by weight, more preferably equal to or greater than 60% by weight, and still more preferably equal to or greater than 80% by weight, with respect to the total quantity of components which constitute the monomeric mixture.

The mixture of acrylic monomers may contain, in addition to the acrylic monomer, also one or more copolymerisable monomers. The mixture of acrylic monomers, when containing such copolymerisable monomers, may provide a pressure-sensitive adhesive with a higher cohesion force and more satisfactory adhesive properties, such as the adhesion force (adhesive force) and the retention power. Each of the different copolymerisable monomers may be used alone or in combination.

Examples of copolymerisable monomers include carboxyl-containing monomers such as acrylic acid, methacrylic acid, carboxyethyl acrylate, carboxypentyl acrylate, itaconic acid, maleic acid and crotonic acid; hydroxyl-containing monomers, such as 2-hydroxyethyl(meth)acrylate, 2-hydroxypropyl(meth)acrylate, 4-hydroxybutyl(meth) acrylate, 6-hydroxyethyl(meth)acrylate, 8-hydroxyoctyl (meth)acrylate, 10-hydroxydecyl(meth)acrylate, 12-hydroxylauryl(meth)acrylate and 4-hydroxymethylcyclohexyl(meth)acrylate anhydride monomers such as maleic anhydride and itaconic anhydride; sulphur-containing monomers such as 2-acrylamide-2-methylpropanesulfonic acid and sulphopropyl acrylate; phosphorus-containing monomers such as 2-hydroxyethyl acrylate phosphate; amide monomers such as (meth)acrylamide and N-substituted (meth)acrylamides such as N-methylolacrylamide; succinimidic monomers such as N-(meth)acryloyloxymethylenesuccinimide, N-(meth)acryloyl-6-oxyesamethylenesuccinimide and N-(meth)acryloyl-8-oxyoctamethylenesuccinimide; vinyl monomers such as vinyl acetate, N-vinylpyrrolidone, N-vinylcarboxamide, styrene and N-vinylcaprolactam; cyanoacrylate monomers such as acrylonitrile and methacrylonitrile; acrylic ester monomers such as glycidyl(meth)acrylate, tetrahydrofurfuryl(meth)acrylate, polyethylene glycol(meth)acrylate, polypropylene glycol (meth)acrylate, (meth)acrylate containing fluorine, silicon (meth)acrylates and 2-methoxyethyl acrylate.

If the mixture of acrylic monomers contains one or more copolymerisable monomers, the ratio (by weight) of acrylic monomers to copolymerisable monomers is between 50:50 and 99.9:0.1, between 70:30 and 99.5:0.5 and between 85:15 and 99:1.

Examples of commercially available PSA adhesives useful for the purposes of the present invention are adhesives of the company Nitto Denko Corporation (Japan), in particular adhesives 5005P, 5005T, 5005TFF, 5015P, 5015T, 5015TFF, Hyperjoint® 9004.

The Applicant has surprisingly found that the particularly preferred thermally activatable adhesives according to the present invention show a good affinity with the protective layer and, where present, with the ink layer on which they are deposited, as well as a good adhesion to low energy surfaces such as the composition of a sidewall of a tyre.

In a particular application of the invention, a mixture of cross-linkable polymers comprising modified natural or synthetic rubber (preferably natural or synthetic epoxidised rubber), an ABA type block copolymer and a cross-linkable urethane rubber is considered.

The term "epoxidised natural or synthetic rubber" means a product obtained by introducing an epoxy group in a double-bonded portion of a molecule of natural or synthetic rubber.

Epoxidised natural rubber can be formed using a commercially available epoxidised natural rubber or by epoxidising a natural rubber. The epoxidised synthetic isoprenic rubber can be formed using a commercially available epoxidised synthetic isoprenic rubber or epoxidising a synthetic isoprenic rubber.

The methods for epoxidising a natural or synthetic polyisoprene rubber are not particularly limited and can be selected appropriately according to the intended use, for example a chlorhydrin process, a direct oxidation process, a hydrogen peroxide process, an alkyl hydroperoxide process and a peroxidation process. The peroxidation process includes, for example, a process that allows a natural rubber to react with an organic peracid, such as peracetic acid and performic acid.

The degree of epoxidation of epoxidised natural or synthetic rubber can be suitably selected according to the intended use without particular limitations, and is preferably between 20 and 80 mol %, more preferably between 40 and 60 mol %. Mixtures of two or more epoxidised natural rubbers with a different degree of epoxidation may be used.

The content of natural or synthetic rubber, possibly epoxidised, in the adhesive mixture is preferably between 20 and 60 parts by weight, more preferably from 30 to 50 parts by weight.

Examples of commercially available epoxidised natural rubber useful for the purposes of the present invention are the rubbers produced by the company Felda Rubber Industries Sdn, Kuala Lumpur (Malaysia), such as, for example, the epoxidised natural rubber Ekoprena 25.

The ABA type block copolymer is a copolymer obtained by polymerising two components, monomer A and monomer B, such as for example the styrene-isoprene-styrene copolymer (SIS), the styrene-butadiene-styrene copolymer (SBS) and the Styrene-Ethylene-Butylene-Styrene copolymer (SEBS).

The content of block copolymer in the adhesive mixture is preferably between 10 and 50 parts by weight, more preferably from 20 to 40 parts by weight.

Examples of commercially available block copolymers useful for the purposes of the present invention are the copolymers produced by the company Kraton Polymers US LLC, Houston, Texas, such as, for example, the Kraton D11165P, Kraton D1126, and Kraton D1124 copolymers, the copolymers produced by the company TSRC Corp., Taiwan, such as, for example, the Vector® SIS copolymers Grades 4111A, 4113A, 4114A, 4186A, 4187A, 4211A, 4213N, 4215A, 4255A, 4293A, 4411A, and 4116N, the copolymers produced by the company Versalis SpA, Milan, Italy, such as, for example, the Europrene® SOL T Grades 190, 9113, 9133 and 9326 copolymers, and the copolymers produced by the company Kuraray Europe GmbH, such as the HYBRAR™ Grades 5125 and 5127 copolymers, and the SEPTON™ Grades 2002, 2004, 2005, 2006, and 2104 copolymers.

The cross-linkable urethane rubber is a polymer containing urethane groups and cross-linkable groups in the polymeric structure comprising reactive double bonds (for example polydiene fragments or allyl groups). The urethane rubbers preferably used for the purposes of the present invention are polyester polyurethane rubbers and polyether polyurethane rubbers, obtained by the addition of polyesters or polyethers with a suitable diisocyanate. Polyether polyurethane rubbers are particularly preferred.

The content of urethane rubber in the adhesive mixture is preferably between 0 and 50 parts by weight, more preferably from 10 to 40 parts by weight.

Examples of commercially available cross-linkable urethane rubber useful for the purposes of the present invention are urethane rubbers produced by the company Rein Chemie GmbH, Mannheim, Germany, such as, for example, Urepan® 50EL06G urethane rubber, and urethane rubbers produced by the company TSE Industries, Inc. Clearwater, Florida, such as the Millathane® E34, E40, CM, 55, 76 and HT urethane rubbers.

The adhesives may be in the form of hot melt adhesives, solution or emulsion.

In forming the adhesive composition, it is preferable to add one or more tackifying resins such as the rosin derivatives, polyterpene resins, modified aromatic terpene resins and hydrogenated products thereof, phenolic terpene resins, coumarone-indene resins, aliphatic oil resins, aromatic resins and related hydrogenated products. Of these, rosin derivatives and aromatic hydrocarbon resins are preferably used.

Furthermore, two or more tackifying resins with different softening points are preferably used. This is due to the fact that the relatively high resin softening point is effective for developing adhesive/cohesive properties at high temperatures, while low temperature adhesiveness is achieved by using a relatively low softening point resin. In this way, adhesion/cohesion performance can be achieved in a relatively wide temperature range.

Examples of commercially available resins useful for the purposes of the present invention are the rosin-derived resins produced and distributed by the company DRT SA, France, such as for example the Dertoline PLS, Dertoline MG and Dertoline MG130 resins, and the hydrocarbon resins produced and distributed by Eastman Chemical Company, such as the Kristalex 5140LV resin.

The content of the tackifying resin(s) in the adhesive composition is preferably between 10 and 80 parts by weight, more preferably from 10 to parts by weight, with respect to 100 parts by overall weight of epoxidised natural rubber, block copolymer and, if present, cross-linkable urethane rubber.

Moreover, in the adhesive composition, plasticisers, various additives, such as fillers, inorganic particles, organic particles, weight agents, flow agents, pigments, dyes, antioxidants, ultraviolet light absorbers, light stabilisers and the like may be present, if necessary. Antioxidants are selected from the group consisting of aromatic amines, phenols, benzimidazoles, dithiocarbamates, thioureas, phosphites, thioacids and similar wax-based anti-ageing agents, preferably avoiding staining stabilisers such as, for example, N-(1,3)-dimethylbutyl)-N'-phenyl-p-phenylenediamine (DMBPPD), N-phenyl-N'-isopropyl-p-phenylenediamine (IPPD), or N-(1,3-dimethylbutyl)-N'-phenyl-phenylen diamine (6PPD), which could compromise the stability in the light of the final product. Among these, from the point of view of storage stability, phenolic antioxidants are preferred.

In the rubber-based adhesive mixture, a peroxide-based cross-linking agent or a sulphur-based vulcanisation system may be provided.

The peroxide that can be used as a cross-linking agent is not limited to particular compounds. Illustrative examples include dicumyl peroxide, 1,3-bis(t-butyl peroxyisopropyl) benzene and 2,5-dimethyl-2,5-di(t-butylperoxy)hexane, 1,1-di-butylperoxide-3,3,5-trimethylcyclohexane, cumene hydroperoxide, dioctyl peroxide, t-butylcumyl peroxide, p-chlorobenzoyl peroxide, t-butyl peroxybenzoate and t-butyl peroxyisopropyl carbonate.

In the peroxide system, cross-linking co-agents may be used such as for example triallyl-isocyanurate (TAIC), trimethyl-isocyanurate (TMAIC), triallyl-cyanurate (TAC), tri-allil-trimellitate (TATM), and mixtures and acrylic or methacrylic derivatives thereof such as trimethylol propane trimethacrylate or acrylic and methacrylic acid salts or maleimide derivatives such as N,N'-m-phenylendimaleimide.

The sulphur-based vulcanisation system includes the components typically used in the vulcanisation of rubber, comprising an activation system, an accelerator or a mixture of accelerators, and sulphur or sulphur donor systems.

The activation system typically includes a zinc oxide, stearic acid and organic zinc salts. The vulcanisation accelerator typically comprises: thiuram, such as, for example, tetramethyl thiuram monosulphide TMTM, tetramethyl thiuram disulphide TMTD, tetraethyl thiuram disulphide TETD, tetrabutyl thiuram disulphide TBuTD, di-pentamethylene thiuram tetrasulphide, tetrabenzyl thiuram disulphide TBzTD; dithiocarbamates, such as, for example, zinc dimethylditiocarbamate ZDMC, zinc dibenzyl dithiocarbamate ZBEC; thiazoles, such as, for example, 2-mercaptobenzothiazole MBT, dibenzothiazil disulphide MBTS; sulphenamides, such as, for example, N-cyclohexyl-2-benzothiazolsulphenamide CBS, N-t-butyl-2-benzothiazole sulphenamide TBBS; sulphenimides, such as, for example, t-butyl 2-benzothiazole sulphenimide TBSI); guanidines, such as, for example, diphenylguanidine DPG; aldehydes and amines, thioureas and the like, xanthate. The vulcanisation accelerator may be used alone or in combination.

The vulcanisation agents may be used alone or in combination and include sulphur and sulphur donor systems, such as, for example, disulphide caprolactam (CLD), disulphide dithiophosphate (SDT), dipentamethylenethiuram hexasulphide, dithiobismorpholine, dipentamethylene urethane tetrasulphide, dialkyl dithiophosphate polysulphide, bis-triethoxysilylpropyl polysulphide, 2-(4-morpholinyl dithio)-benzothiazole, tetramethylthiuram disulphide, tetraethylthiuram disulphide, alkylphenoldisulphides and mixtures thereof.

The content of the sulphur-based vulcanisation system is preferably between 0.5 and 50 parts by weight, more preferably 1 to 30 parts by weight, and even more preferably from 1.5 to 20 parts by weight, with respect to 100 parts by overall weight of epoxidised natural rubber, block copolymer and, if present, cross-linkable urethane rubber.

The tyre according to the present invention comprises at least one carcass structure, a tread band applied in a position radially external to said carcass structure, and a pair of sidewalls applied laterally on opposite sides with respect to said carcass structure.

Preferably, the tyre according to the present invention comprises a pair of sidewalls made with a non-staining cross-linkable elastomeric composition, comprising (i) at least one diene elastomeric polymer, and (ii) an ozone protection system.

The ozone protection system may comprise conventional systems comprising the association of antioxidants based on aromatic amines, phenols, benzimidazoles, dithiocarbamates, thioureas, phosphites, thioacids, waxes, such as petroleum wax, and any other static protective agents such as, for example, polyethylene glycol and (meth)acrylic copolymers.

Advantageously, the ozone protection system substantially consists of at least one phenolic antioxidant in an amount equal to or greater than 3 phr, preferably equal to or greater than 4 phr, optionally in combination with at least one cyclic acetal or enol-ether antioxidant, in an amount equal to or greater than 1 phr, preferably equal to or greater than 2 phr, as described in the international patent application no. PCT/IB2018/051388.

Advantageously, the ozone protection system does not comprise, that is to say, comprises a quantity equal to 0 phr, of static polymeric protective elements represented by the group of compounds consisting of wax, polyethylene glycols, (meth)acrylic copolymers and EPDM.

Useful examples of usable phenolic antioxidants are pentaerythrityl tetrakis[3-(3,5-di-t-butyl-4-hydroxyphenyl)propionate]distributed by BASF as IRGANOX 1010; 2,2-thiodiethylene bis-[(3-(3,5-di-t-butyl-4-hydroxyphenyl)propionate)]distributed by BASF as IRGANOX 1035; octadecyl-3-(3,5-di-t-butyl-4-hydroxyphenyl)propionate distributed by BASF as IRGANOX 1076; isooctyl-3-(3,5-di-t-butyl-4-hydroxyphenyl)propionate distributed by BASF as IRGANOX 1135; 1,3,5-trimethyl-2,4,6-tris(3,5-di-t-butyl-4-hydroxybenzyl)benzene distributed by BASF as IRGANOX 1330; 4,6-bis(dodecylthiomethyl)-o-cresol distributed by BASF as IRGANOX 1726; 4,6-bis(octylthiomethyl)-o-cresol distributed by BASF as IRGANOX 1520; triethyleneglycol-bis[(3-(3-t-butyl-5-methyl-4-hydroxyphenyl) propionate)] distributed by BASF as IRGANOX 245; 1,6-hexanediol-bis[(3-(3,5-di-t-butyl-4-hydroxyphenyl)propionate]distributed by BASF as IRGANOX 259; 4-{[4,6-bis(octylsulfanil)-1,3,5-triazin-2-yl]amino]-2,6-di-t-butyl-phenol distributed by BASF as IRGANOX 565.

Preferably, said phenolic antioxidant is selected from the group consisting of 4,6-bis(octylthiomethyl)-o-cresol distributed by BASF as IRGANOX 1520 and 4-{[4,6-bis(octylsulphanil)-1,3,5-triazin-2-yl]amino}-2,6-di-t-butylphenol distributed by BASF as IRGANOX 565.

Useful examples of cycloacetal or enol-ether antioxidants are 3,9-di-3-cyclohexen-1-yl-2,4,6,10-tetraoxaspyro[5.5] undecane distributed by Lanxess as Vulkazon AFS/LG, and cyclohexen-3-ylidenmethyl-benzylether distributed by Lanxess as Vulkazon AFD.

According to a preferred embodiment, the elastomeric composition used to make the sidewall of the tyre comprises for 100 phr of said elastomeric composition:
 ($a_1$) at least one polyisoprene rubber in an amount greater than or equal to 20 phr, preferably from 30 phr to 90 phr, and
 ($a_2$) at least one diene elastomeric polymer other than polyisoprene rubber ($a_1$) in an amount of less than or equal to 80 phr, preferably from 10 phr to 70 phr.

According to a preferred embodiment, the polyisoprene rubber ($a_1$) may be selected from natural or synthetic polyisoprene rubber, preferably from natural or synthetic cis-1-4-polyisoprene rubber, synthetic 3,4-polyisoprene rubber, more preferably from natural cis-1,4-polyisoprene rubber (natural rubber). Preferably, said natural rubber is present in the above cross-linkable elastomeric composition in an amount of from 30 phr to 60 phr, more preferably from 30 phr to 50 phr.

According to a preferred embodiment, the diene elastomeric polymer ($a_2$ (other than polyisoprene rubber ($a_1$) can be selected from among those commonly used in elastomeric compositions cross-linkable with sulphur, which are particularly suitable for the production of tyres, or from elastomeric polymers or copolymers having an unsaturated chain having a glass transition temperature ($T_g$) generally below 20° C., preferably within the range of 0° C. to −110° C. These polymers or copolymers can be of natural origin or can be obtained by polymerisation in solution, polymerisation in emulsion or polymerisation in gas phase of one or more conjugated diolefins, optionally mixed with at least one comonomer selected from polar monovinylarenes and/or comonomers in an amount not exceeding 60% by weight.

Conjugated diolefins generally contain from 4 to 12, preferably from 4 to 8 carbon atoms and may be selected, for example, from the group comprising: 1,3-butadiene, 2,3-dimethyl-1,3-butadiene, 1,3-pentadiene, 1,3-hexadiene, 3-butyl-1,3-octadiene, 2-phenyl-1,3-butadiene or mixtures thereof. 1,3-butadiene is particularly preferred.

The monovinylarenes that can be optionally used as comonomers generally contain from 8 to 20, preferably from 8 to 12 carbon atoms and can be selected, for example, from: styrene; 1-vinylnaphthalene; 2-vinylnaphthalene; various alkyl, cycloalkyl, aryl, alkylaryl or arylalkyl derivatives of styrene such as α-methylstyrene, 3-methylstyrene, 4-propylstyrene, 4-cyclohexylstyrene, 4-dodecylstyrene, 2-ethyl-4-benzylstyrene, 4-p-tolyl-styrene, 4-(4-phenylbutyl)styrene, or mixtures thereof. Styrene is particularly preferred.

Polar comonomers that may optionally be used can be selected, for example, from: vinylpyridine, vinylquinoline, acrylic acid and alkylacrylic acid esters, nitriles, or mixtures thereof, such as, for example, methyl acrylate, ethyl acrylate, methyl methacrylate, ethyl methacrylate, acrylonitrile or mixtures thereof.

Preferably, the diene elastomeric polymer ($a_2$) can be selected, for example, from: polybutadiene (in particular polybutadiene with a high content 1,4-cis), optionally halogenated isoprene/isobutene copolymers, 1,3-butadiene/acrylonitrile copolymers, styrene/1,3-butadiene copolymers (SBR), styrene/isoprene/1,3-butadiene copolymers, styrene/1,3-butadiene/acrylonitrile copolymers, or mixtures thereof. Polybutadiene (in particular, polybutadiene with a high content 1,4-cis, usually above 90%, and a low vinyl content, usually below 5%) or mixtures thereof are particularly preferred. Preferably, said polybutadiene is present in the above cross-linkable elastomeric composition in an amount of from 40 phr to 70 phr, more preferably from 50 phr to 70 phr.

The above cross-linkable elastomeric composition can optionally comprise at least one elastomeric polymer of one or more monoolefins with an olefinic comonomer or derivatives thereof. Monoolefins can be selected from: ethylene and α-olefins generally containing 3 to 12 carbon atoms, such as for example propylene, 1-butene, 1-pentene, 1-hexene, 1-octene or mixtures thereof. The following are preferred: copolymers selected from ethylene and an α-olefin, optionally with a diene; isobutene homopolymers or copolymers thereof with small amounts of a diene, which are optionally at least partially halogenated. The diene optionally present generally contains 4 to 20 carbon atoms and is preferably selected from: 1,3-butadiene, isoprene, chloroprene, neoprene, 1,4-hexadiene, 1,4-cyclohexadiene, 5-ethylidene-2-norbornene, 5-methylene-2-norbornene, vinylnorbornene or mixtures thereof. Among them, the following are particularly preferred: ethylene/propylene (EPR) copolymers or ethylene/propylene/diene (EPDM) copolymers; polyisobutene; butyl rubber; halobutyl rubbers, in particular chlorobutyl or bromobutyl rubbers; or mixtures thereof.

The above cross-linkable elastomeric composition can optionally comprise at least an polysoprene rubber ($a_1$) and/or at least one diene elastomeric polymer ($a_2$) functionalised by reaction with suitable terminating agents or coupling agents. In particular, the diene elastomeric polymers obtained by anionic polymerization in the presence of an organometallic initiator (in particular, an organolithium initiator) may be functionalised by reacting the residual organometallic groups derived from the initiator with suitable terminating agents or coupling agents such as, for example, imines, carbodiimides, alkyltin halides, substituted benzophenones, alkoxysilanes or aryloxysilanes (see, for example, European patent EP 451 604 or U.S. Pat. Nos. 4,742,124 and 4,550,142).

At least one reinforcing filler may be advantageously added to the above cross-linkable elastomeric composition above, generally in an amount of from 0 phr to 120 phr, preferably from 20 phr to 90 phr. The reinforcement filler may be selected from those commonly used for cross-linked manufactured articles, in particular for tyres, such as carbon black, silica, alumina, aluminosilicates, calcium carbonate, kaolin or mixtures thereof. Carbon black, silica and mixtures thereof are particularly preferred.

According to a preferred embodiment, said carbon black reinforcement filler can be selected from those having a surface area of not less than 20 m²/g (as determined by Statistical Thickness Surface Area—STSA—according to ISO 18852:2005).

Silica, which can be used in the present invention, may be generally a fumed silica or preferably a precipitated silica, with a surface area BET (as measured according to the ISO 5794/1 standard) of from 50 m²/g to 500 m²/g, preferably from 70 m²/g to 200 m²/g.

When a reinforcement filler comprising silica is present, the cross-linkable elastomeric composition may advantageously incorporate a silane coupling agent able to interact with silica and link it to the elastomeric polymer during the vulcanisation.

The coupling agents that are used preferably are silane-based ones that can be identified, for example, by the following structural formula (I):

$(R_2)_3Si—C_tH_{2t}—X$          (I)

wherein the $R_2$ groups, which can be equal or different from each other, are selected from: alkyl, alkoxy or aryloxy groups or halogen atoms, with the proviso that at least one of the $R_2$ groups is an alkoxy or an aryloxy group; t is an integer of between 1 and 6 inclusive; X is a group selected from: nitrose, mercapto, amino, epoxide, vinyl, imide, chlorine, —$(S)_uC_tH_{2t}$—Si—$(R_2)_3$ or —S—$COR_2$, wherein u and t are integers of between 1 and 6, ends included and the $R_2$ groups are as defined above.

Among the coupling agents, bis(3-triethoxysilylpropyl)tetrasulphide and bis(3-triethoxysilylpropyl)disulphide are particularly preferred. Said coupling agents may be used as such or as suitable mixtures with an inert filler (such as carbon black) so as to facilitate their incorporation into the cross-linkable elastomeric composition.

According to a preferred embodiment, said silane coupling agent is present in the elastomeric composition in an amount ranging between 0.01 phr and about 10 phr, preferably between about 0.5 phr and about 5 phr.

The cross-linkable elastomeric composition of the sidewall may be vulcanised according to known techniques, in particular with sulphur-based vulcanising systems commonly used for diene elastomeric polymers. To this end, after one or more thermomechanical processing steps, a sulphur-based vulcanising agent is incorporated in the materials, together with vulcanisation accelerators. In the final treatment step, the temperature is generally kept below 120° C. and preferably below 100° C., so as to prevent any undesired pre-crosslinking phenomena.

Preferably, said vulcanising agent comprises sulphur-based vulcanising systems comprising sulphur or sulphur-containing molecules (sulphur donors) together with accelerators and/or vulcanisation activators known in the art.

Activators that are particularly effective are zinc compounds, and in particular ZnO, $ZnCO_3$, zinc salts of saturated or unsaturated fatty acids containing from 8 to 18 carbon atoms, such as, for example, zinc stearate, which are preferably formed in situ in the elastomeric composition from ZnO and fatty acid or mixtures thereof.

The accelerators which are commonly used may be selected from: dithiocarbamates, guanidine, thiourea, thiazoles, sulphenamides, thiurams, amines, xanthates or mixtures thereof.

According to a preferred embodiment, the cross-linkable elastomeric composition of the sidewall comprises a quantity of vulcanising agent equal to or greater than about 1 phr, preferably equal to or greater than about 2 phr.

Preferably, the quantity of vulcanising agent is less than or equal to about 7.5 phr, preferably less than or equal to about 7.

Advantageously, the quantity of sulphur is between about 2 phr and about 6.5 phr.

Said elastomeric composition may comprise other commonly used additives, selected on the basis of the specific application for which the composition is intended.

In particular, in order to improve the processability, said vulcanizable elastomeric composition may be admixed with a plasticiser generally selected from mineral oils, vegetable oils, synthetic oils or mixtures thereof, such as, for example, aromatic oil, naphthenic oil, phthalates, soybean oil or mixtures thereof. The amount of plasticiser generally ranges from 0 phr and about 70 phr, preferably from about 5 phr to about 30 phr.

The above cross-linkable elastomeric composition may be prepared by mixing together the base elastomeric components (a) together with the above ozone protection system (b) and with the other optionally present additives, according to the techniques known in the art. The mixing steps can be performed, for example, using an open mixer of the cylinder type or an internal mixer of the type with tangential rotors (Banbury) or with interpenetrating rotors (Intermix), or in continuous mixers of the Ko-Kneader type (Buss) or of the co-rotating or counter-rotating twin-screw type.

DRAWINGS

The description is given hereinafter with reference to the accompanying drawings, provided only for illustrative and, therefore, non-limiting purposes, in which.

DETAILED DESCRIPTION OF THE INVENTION

The present description relates by way of example to a tyre for motor vehicle wheels. The Applicant believes that the present invention can also be applied to tyres for different vehicles such as heavy vehicles, motorcycles, bicycles.

Figure 1:
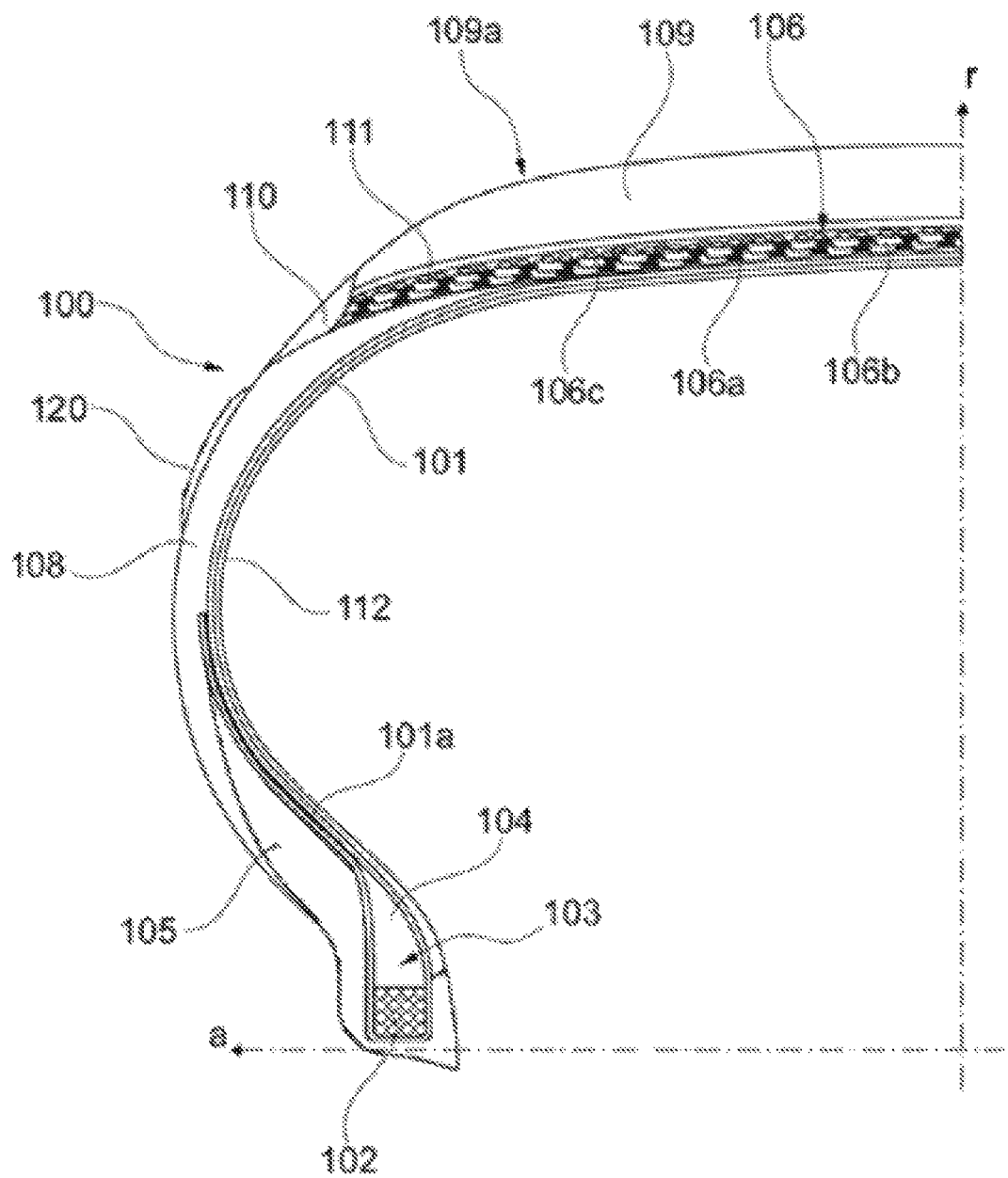
FIG. 1 shows a cross half-section showing a tyre for motor vehicle wheels according to a first embodiment of the present invention.

In FIG. 1, "a" indicates an axial direction and "r" indicates a radial direction. For simplicity, FIG. 1 shows only a portion of the tyre, the remaining portion not shown being identical and arranged symmetrically with respect to the radial direction "r".

With reference to FIGS. 1, the tyre 100 for motor vehicle wheels comprises at least one carcass structure, comprising at least one carcass layer 101 having respectively opposite end flaps engaged with respective annular anchoring structures 102, referred to as bead cores, possibly associated to a bead filler 104. The tyre area comprising the bead core 102 and the filler 104 forms a reinforcement annular structure 103, the so-called bead, intended for anchoring the tyre onto a corresponding mounting rim, not shown.

The carcass structure is usually of radial type, i.e. the mutually parallel reinforcement elements of the at least one carcass layer 101 lie on planes comprising the rotational axis of the tyre and substantially perpendicular to the equatorial plane of the tire.

Alternatively, tires (not shown) are provided with cross-ply carcass structures.

In such tyres, the carcass structure may comprise at least a first and a second radially overlapping carcass ply, each made of elastomeric material and comprising a plurality of mutually reinforcing elements arranged parallel to one another.

The carcass plies are radially overlapped so that the reinforcing elements of a ply are inclined with respect to the reinforcing elements of the radially overlapped carcass ply and to the equatorial plane.

Said reinforcing elements may consist of metallic and/or textile cords, for example steel in the case of metallic cords or lyocell, rayon, nylon, polyester [for example polyethylene naphthalate (PEN)] in the case of textile cords. Each reinforcement annular structure is associated to the carcass structure by folding back of the opposite lateral edges of the at least one carcass layer 101 around the annular anchoring structure 102 so as to form the so-called carcass flaps 101a as shown in FIG. 1.

In one embodiment, the coupling between the carcass structure and the reinforcement annular structure can be provided by a second carcass layer (not shown in FIG. 1) applied in an axially outer position with respect to the first carcass layer.

An anti-abrasive strip 105 is arranged in an outer position of each reinforcement annular structure 103. Preferably each anti-abrasive strip 105 is arranged at least in an axially outer position to the reinforcement annular structure 103 extending at least between the sidewall 108 and the portion radially below the reinforcement annular structure 103.

Preferably, the anti-abrasive strip 105 is arranged so as to enclose the reinforcement annular structure 103 along the axially inner and outer and radially lower areas of the reinforcement annular structure 103 so as to interpose between the latter and the wheel rim when the tyre 100 is mounted to the rim.

The carcass structure is associated to a belt structure 106 comprising one or more belt layers 106a, 106b placed in radial superposition with respect to one another and with respect to the carcass layer, having typically metallic reinforcement cords. Such reinforcing cords may have crossed orientation with respect to a direction of circumferential development of tyre 100. By "circumferential" direction it is meant a direction generally facing in the direction of rotation of the tyre.

At least one zero-degree reinforcement layer 106c, commonly known as a "0° belt", may be applied in a radially outermost position to the belt layers 106a, 106b, which generally incorporates a plurality of reinforcement cords, typically textile cords, oriented in a substantially circumferential direction, thus forming an angle of a few degrees (such as an angle of between about 0° and 6°) with respect to the equatorial plane of the tyre, and coated with an elastomeric material.

A tread band 109 of elastomeric blend is applied in a position radially outer to the belt structure 106.

In some embodiments (for example tyres for motorcycle or scooter wheels), the belt structure may be absent.

Moreover, respective sidewalls 108 of elastomeric material are further applied in an axially outer position on the lateral surfaces of the carcass structure, each extending from one of the lateral edges of the tread 109 at the respective reinforcement annular structure 103, preferably made with non-staining elastomeric compound, for example the compound of example 3.

In a radially outer position, the tread band 109 has a rolling surface 109a intended to come in contact with the ground. Circumferential grooves, which are connected by transverse notches (not shown in FIG. 1) so as to define a plurality of blocks of various shapes and sizes distributed over the rolling surface 109a, are generally made on this surface 109a, which for simplicity is represented smooth in FIG. 1.

An under-layer 111 is arranged between the belt structure 106 and the tread band 109.

A strip consisting of elastomeric material 110, commonly known as "mini-sidewall", can optionally be provided in the connecting zone between the sidewalls 108 and the tread band 109, this mini-sidewall being generally obtained by co-extrusion with the tread band 109 and allowing an improvement of the mechanical interaction between the tread band 109 and the sidewalls 108. Preferably, the end portion of sidewall 108 directly covers the lateral edge of the tread band 109.

In the case of tubeless tyres, a rubber layer 112, generally known as "liner", which provides the necessary impermeability to the inflation air of the tyre, can also be provided in a radially inner position with respect to the carcass layer 101.

According to the present invention, the decorative elements 120, such as coloured bands or writings, preferably with light colours, made according to the present invention are applied on the outer surface of the sidewalls 108 by hot gluing.

Figure 2:
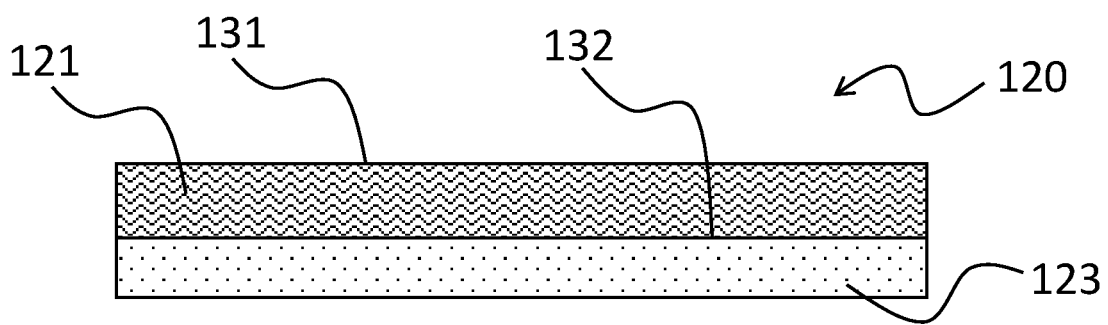
FIG. 2 shows a cross-section of the label according to the present invention comprising a protective layer and an adhesive layer.

With reference to FIG. 2, the decorative elements 120 according to the present invention comprise a protective layer 121 with a surface 131 facing outwards exposed to the action of atmospheric agents, and an adhesive layer 123, applied to the surface 132 of the protective layer 121 facing the sidewall 108 of the tyre 100, which adheres the decorative element 120 to the sidewall 108 of the tyre 100. In the example of FIG. 2, the protective layer 121 is generally coloured by the incorporation, during the construction thereof, of a suitable coloured and covering pigment.

Figure 3:
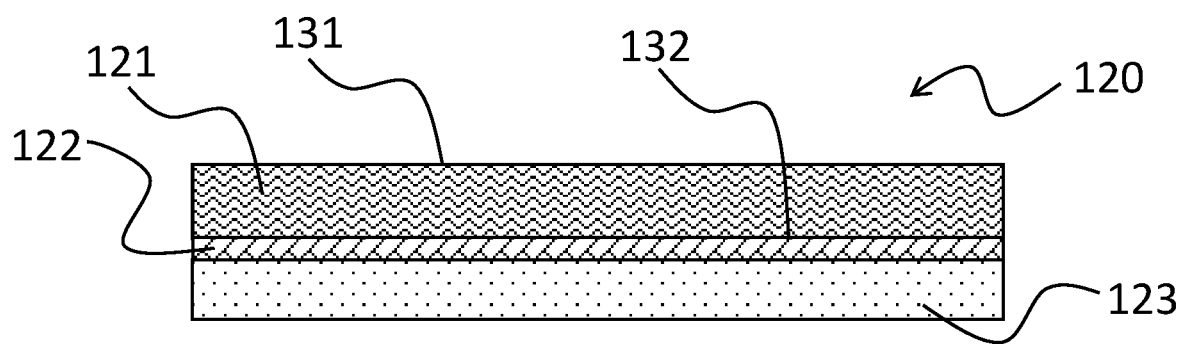
FIG. 3 shows a cross-section of the label according to the present invention comprising a protective layer, an ink layer and an adhesive layer.

With reference to FIG. 3, the decorative elements 120 according to the present invention comprise a protective layer 121 with a surface 131 facing outwards exposed to the action of atmospheric agents and to the stresses deriving from contact with sidewalks and other materials, an ink layer 122 printed on the surface 132 of the protective layer 121 facing the sidewall 108 of the tyre 100, and an adhesive layer 123, applied on the ink layer 122, which adheres the decorative element 120 to the sidewall 108 of the tyre 100. In the example of FIG. 3, the protective layer is generally transparent and colourless, but it may be transparent and coloured by incorporating, during the construction thereof, a suitable coloured pigment so as to make the decorations or the printed wordings of the ink layer stand out more, by contrast of colour.

The material of the protective layer 121 is preferably made of cross-linked aliphatic polyurethane, based on polyester and/or polyether, in particular with transparent or coloured polyurethane films made by the company NTT SrI, Fagnano Olona (Italy) under the trade name X-SIDE01.

The material of the adhesive layer 123 is preferably made with pressure-sensitive adhesives (PSA), in particular the adhesives of the company Nitto Italia Srl, Milan (Italy), such as for example the adhesives 5005P, 5005T, 5005TFF, 5015P, 5015T, 5015TFF, Hyperjoint® 9004, and thermally activatable adhesives (TA—Thermo Adhesives), in particular a mixture of cross-linkable polymers including modified natural rubber (preferably epoxidised natural rubber), an ABA type block copolymer, and optionally a cross-linkable urethane rubber.

The building of the tyres 100 as described above may be carried out by assembling respective semi-finished products onto a forming drum, not shown, by at least one assembly device.

At least a part of the components intended to form the carcass structure of the tyre may be built and/or assembled on the forming drum. More particularly, the forming drum is intended to first receive the possible liner, then the carcass structure and the anti-abrasive strip. Thereafter, devices non shown coaxially engage one of the annular anchoring structures around each of the end flaps, position an outer sleeve comprising the belt structure and the tread band in a coaxially centred position around the cylindrical carcass sleeve and shape the carcass sleeve according to a toroidal configuration through a radial expansion of the carcass structure, so as to cause the application thereof against a radially inner surface of the outer sleeve.

After the building of the green tyre, a moulding and vulcanisation treatment is generally carried out in order to determine the structural stabilisation of the tyre through cross-linking of the elastomeric blends, as well as to impart a desired tread pattern on the tread band and to impart any distinguishing graphic signs at the sidewalls.

The decorative elements 120 are hot applied to the sidewalls of the finished tyre downstream of the moulding and vulcanisation treatment.

The present invention will be further illustrated below by means of a number of preparation examples, which are given purely as an indication and without any limitation of the present invention.

Example 1

Abrasion Resistance of the Protective Layer

The abrasion resistance was measured using a Taber Abrasion Tester model XHF-17 equipped with a H22 grinder based on vitrified clay and aluminium oxide particles with about 515 abrasive particles per $cm^2$ with a load of 1 kg and frequency of rotation equal to 1 Hz (1 cycle per second).

The labels were applied to a sample of sidewall compound (as described in example 3) and were subjected to test with 100, 200 and 500 cycles.

The label of the invention consisted of the X-SIDE 01 transparent cross-linked polyurethane film of the company NTT printed with a homogeneous layer of Nylontech PLT white ink in turn covered with a layer of thermally activatable adhesive T1 (as described in example 2). The total thickness of the label I was about 140 μm.

The label of the invention I has resisted perfectly, without any sign of surface deterioration under all test conditions (100, 200, and 500 cycles), and showing incipient signs of deterioration only in the area of attachment of the grinder at the test of 200 and 500 cycles caused by the typical step effect of the test conditions.

Dynamic Mechanical Properties of the Protective Layer

The dynamic mechanical properties E' and Tan delta of the materials were measured using a dynamic DMA EPLEXOR 500N device from NETZSCH GABO Instruments. The test conditions were: static deformation 1% (in traction), dynamic deformation ±0.1%, frequency 1 Hz, load cell 25N, temperature range from −80° C. to +70*C, temperature increase 2° C./minute.

The dynamic mechanical properties are expressed in terms of dynamic elastic modulus (E') and Tan delta (loss factor). The Tan delta value was calculated as the ratio between the viscous dynamic module (E") and the dynamic elastic modulus (E').

The test was performed with three samples of protective layer of the company NTT, as follows:

| | |
|---|---|
| X-SIDE 01 | transparent cross-linked polyurethane film, thickness 90 μm ± 10 μm, width 10 mm, length 20 mm (useful length between the device clamps 10 mm) |
| X-SIDE 02 | white opaque cross-linked polyurethane film with 5% by weight titanium dioxide (TiO2), thickness 90 μm ± 10 μm, width 10 mm, length 20 mm (useful length between the device clamps 10 mm) |
| X-SIDE 03 | white opaque cross-linked polyurethane film with 10% by weight titanium dioxide (TiO2), thickness 90 μm ± 10 μm, width 10 mm, length 20 mm (useful length between the device clamps 10 mm) |

The results obtained, referred to 25° C., are shown in the following Table 1.

TABLE 1

| | X-SIDE 01 | X-SIDE 02 | X-SIDE 03 |
|---|---|---|---|
| E' (25° C.) | 5-8 MPa | 8-10 MPa | 8-10 MPa |
| Tandelta (25° C.) | 0.40-0.34 | 0.30-0.240 | 0.30-0.240 |

Elastic Properties of the Protective Layer

The elastic properties were measured at 25° C. with the aid of a Zwick model Z010 dynamometer with 500 N load cell, according to the description below, using a rectangular sample (width=10 mm; length>50 mm).

The dynamometer clamps were spaced 50 mm apart and the sample was mounted there. Subsequently, a preload of 0.2 N was imposed, moving the arm to which the upper clamp is connected (hereinafter the cross member) at a speed of 10 mm/min., so as to tension the specimen. With the optical extensometer the new distance between the clamps (L0) to be considered as the initial length of the sample was determined.

The sample was subjected to 4 deformation cycles from 0% to 12% of L0 by moving the cross member at a speed of 500 mm/minute. At the end of the 4 deformation cycles, the residual deformation was determined at the zeroing of the recorded load.

The test was performed with three samples of protective layer of the company NTT as described above. The materials X-SIDE 01, X-SIDE 02 and X-SIDE 03 characterised according to the described conditions show a residual deformation lower than 0.3% after the four 12% deformation cycles.

Example 2

Adhesion Strength of the Adhesive Layer

The adhesion strength was measured using a Zwick model Z010 dynamometer by measuring the peeling force of two flexible adhesion elements in a T-shaped assembly according to the IS011339 standard.

The adhesive subjected to the test is interposed between two layers of superficially untreated PET having a thickness of 50 μm and a width of 20 mm and then coupled together, by screen printing, and after dissolution in a suitable solvent in the case of thermo adhesives, or lamination, in the case of pressure-sensitive adhesives.

The pressure-sensitive adhesives were pressed at 50° C. and left to stand for 72 hours before measuring at 2300. The thermo adhesives were applied at 130° C. for 60 seconds, and left to rest for 24 hours before the measurement taken at 2300. The compositions of the thermo adhesives used are shown in the following tables 2 and 3.

TABLE 2

| Component | T1 | T2 | T3 | T4 |
|---|---|---|---|---|
| EKOPRENA 25 | 40.00 | 50.00 | 50.00 | 50.00 |
| KRATON D1165P | 30.00 | — | — | 50.00 |
| KRATON D1124 | — | 50.00 | — | — |
| KRATON D1126 | — | — | 50.00 | — |
| UREPAN 50 EL06G | 30.00 | — | — | — |
| DERTOLINE PLS | 40.00 | 40.00 | 40.00 | 40.00 |
| Stearic acid | 0.50 | 0.50 | 0.50 | 0.50 |
| Rhenogran ZNO | 2.00 | 2.00 | 2.00 | 2.00 |
| Rhenogran ZBEC 70 | 3.00 | 3.00 | 3.00 | 3.00 |
| Rhenogran MBTS 80 | 3.00 | 3.00 | 3.00 | 3.00 |
| Sulphur | 1.50 | 1.50 | 1.50 | 1.50 |

TABLE 3

| Component | T5 A | T5 C | T5 D | T5 E | T5 F |
|---|---|---|---|---|---|
| EKOPRENA 25 | 40.00 | 40.00 | 40.00 | 40.00 | 40.00 |
| KRATON D1165P | 30.00 | 30.00 | 30.00 | 30.00 | 30.00 |
| UREPAN 50 EL06G | 30.00 | 30.00 | 30.00 | 30.00 | 30.00 |
| DERTOLINE PLS | 60.00 | 40.00 | 40.00 | 30.00 | 25.00 |
| DERTOLINE MG130 | — | — | — | 10.00 | — |
| KRISTALEX 5140 | — | 20.00 | — | — | 15.00 |
| Stearic acid | 0.50 | 0.50 | 0.50 | 0.50 | 0.50 |
| Rhenogran ZNO | 2.00 | 2.00 | 2.00 | 2.00 | 2.00 |
| Rhenogran ZBEC 70 | 6.00 | 6.00 | 6.00 | 6.00 | 6.00 |
| Rhenogran MBTS 80 | 6.00 | 6.00 | 6.00 | 6.00 | 6.00 |
| Sulphur | 3.00 | 3.00 | 3.00 | 3.00 | 3.00 |

EKOPRENA 25 epoxidised natural rubber, Felda Rubber Industries Sdn,

KRATON D1165P linear styrene-isoprene-styrene block copolymer with 30% styrene, Kraton Polymers U.S. LLC, KRATON D1124 branched styrene-isoprene-styrene block copolymer with 30% styrene, Kraton Polymers U.S. LLC, KRATON D1126 radial styrene-isoprene-styrene block copolymer with 21% styrene, Kraton Polymers U.S. LLC, UREPAN 50 ELO6G polyether polyurethane elastomer, based on aromatic isocyanate and polytetramethylene glycol, Rein Chemie GmbH DERTOLINE PLS Rosin-derived resin containing rosin esters with pentaerythritol, softening point 95° C., DRT France DERTOLINE MG130 Rosin-derived resin containing glycerine esters with maleic rosin, softening point 130° C., DRT France KRISTALEX 5140LV Low molecular weight hydrocarbon resin, softening point 140° C.), Eastman Chemical Company Rhenogran ZNO predispersed zinc oxide, Lanxess Rhenogran ZBEC 70 dithiocarbamate accelerator, Rhein Chemie Rhenogran MBTS 80 dibenzothiazil disulphide accelerator, Rhein Chemie The thermo adhesive formulations were prepared in a tangential mixer (Pomini model). The mixing conditions provide for a first step (non-productive stage) in which polymers and activation system were mixed (RPM 65, 70° C.) and a subsequent completion step in which the master batch is finalised (RPM 70, 40° C.). The resins are added in solution before the adhesive is deposited.

The peeling test results are shown in the following table 4. The reported average force refers to a total displacement of 260 mm.

TABLE 4

| Adhesive | Adhesive layer thickness (μm) | Medium peeling force (N) |
| --- | --- | --- |
| T1 | 60 | 8.0 |
| T2 | 74 | 7.8 |
| T3 | 70 | 8.1 |
| T4 | 87 | 8.3 |
| T5 A | 72 | 15.8 |
| T5 C | 52 | 12.9 |
| T5 D | 57 | 11.7 |
| T5 E | 54 | 13.6 |
| T5 F | 56 | 9.7 |
| BS TRANSFER 280/70 PA | 60 | 2.1 |
| NITTO 5015T | 80 | 4.3 |
| NITTO 5015TFF | 80 | 4.2 |
| NITTO 5005TFF | 50 | 4.2 |

The peeling test measured the adhesion strength to PET for all the adhesives tested, with the exception of the adhesive BS TRANSFER 280/70 PA for which the cohesion strength was measured.

Example 3

Light Resistance of the Ink Layer

The light resistance test was performed using a Xenon chamber (supplier Q-Sun) according to the ASTM D1148 method, modified for use of UV exposure only without washing cycles.

Using the mixtures of the following table 5, rubber samples of 15×5×0.5 cm size were made, vulcanised at 170° C. for 10 minutes, representative of the sidewall of a tyre.

TABLE 5

| Component | Quantity (phr) |
| --- | --- |
| First step | |
| Natural rubber | 40 |
| Butadiene rubber | 60 |
| Carbon black 660 | 50 |
| Tackifying resin | 2 |
| Stearic acid | 2 |
| Zinc oxide | 2.85 |
| Irganox 1520 | 8 |

TABLE 5-continued

| Component | Quantity (phr) |
| --- | --- |
| Second step | |
| Retardant | 0.1 |
| CBS | 0.8 |
| Sulphur | 2 |

Natural rubber: VON BUNDIT
Butadiene rubber: NIZHNEKAMSKNEFTECHIM
Carbon black 660: ORION ENGINEERED CARBONS
Tackifying resin: Quintone A100, Zeon Corporation
Stearic acid: Temik Oleo
Zinc oxide: Zincol Ossidi
Irganox 1520: 4,6-bis[(octylthio)methyl]-o-cresol, BASF
Retardant: N-cyclohexylthiophthalimide, Toray Fine Chemicals
CBS: N-cyclohexyl-2-benzothiazyl sulphonamide, Duslo
Sulphur: Zolfoindustria All the components, except for sulphur, the retardant and the accelerator (CBS) were mixed together in an internal mixer (model Pomini PL 1.6) for about 5 minutes (first step). As soon as the temperature reached 145+5° C., the elastomeric composition was unloaded. Sulphur, the retardant and the accelerator (CBS) were then added and mixing was performed in an open roll mixer (second step).

Yellow decorative labels were applied to the resulting samples using the heat transfer method in a manual press applying a pressure of 10 kg/cm$^2$ for 10 seconds at 120° C.

The labels were made using the X-SIDE 01 transparent cross-linked polyurethane protective layer of the company NTT of example 1 subjected to a screen printing process with Nylontech PLT Grafco ink, and subsequently coated with a layer of T5C thermo adhesive (Label 1) or T5F (Label 2).

The specimens thus obtained were exposed to a UV irradiation cycle (120 hours at 50° C.).

At the beginning and at the end of the test, the colour measurements were performed with the CLM-194 colorimeter by EOPTIS, which records the parameters L, a, b which univocally define the same.

The colorimetric results are summarised in the following table 6.

TABLE 6

| | L* | a* | b* |
| --- | --- | --- | --- |
| Before exposure | | | |
| Label 1 | 83.43 | 2.35 | 84.74 |
| Label 2 | 83.17 | 2.18 | 84.28 |
| Mean | 83.3 | 2.265 | 84.51 |
| After exposure | | | |
| Label 1 | 80.99 | 3.04 | 80.61 |
| Label 2 | 80.04 | 3.19 | 79.75 |
| Mean | 80.515 | 3.115 | 80.18 |

The measurement of colour resistance is defined in percentage terms with respect to the colour change before and after UV exposure by means of the following formula:

$$\Delta E^*_{ab} = \sqrt{(L^*_2 - L^*_1)^2 + (a^*_2 - a^*_1)^2 + (b^*_2 - b^*_1)^2}$$

Using the average values of L, a and b given in table 6, the value of $\Delta E^*ab$ was 5.22, which corresponds to a scarcely perceptible difference.

Example 4

Endurance Tests on the Tyre

The endurance tests consist of a high speed test according to ISO 10191:2010 and a fatigue test.

The tyres used were Pirelli P ZERO™ 355/25ZR21 (107Y) XL rear (tyre 1), Pirelli Winter Sottozero™3 225/45R19 96V XL (tyre 2), and Pirelli P ZERO™ 255/30ZR20 (92Y) XL front (tyre 3). All tyres are made with a sidewall compound as described in example 3.

Speed

The high speed test was carried out on different samples of different tyre sizes inflated to a pressure of 2.7 bar, all decorated on the outer side with coloured labels. The test is carried out on an Indoor machine with a 1.7 m diameter drum in a conditioned environment with a controlled temperature of 25° C.

During the test, the tyre was stressed with vertical load cycles, and speeds varying over time. The overall test lasted 1 hour and 10 minutes. The following are the test conditions used:

| Tyre | Vertical load range (kg) | Speed range (km/h) |
| --- | --- | --- |
| 1 | 500 ÷ 800 | 200 ÷ 300 |
| 2 | 350 ÷ 575 | 150 ÷ 210 |
| 3 | 350 ÷ 510 | 200 ÷ 300 |

At the end of the test, the covers were examined to check for defects on the labels (detachments, cracks, colour change, etc.).

Fatigue

The fatigue test was carried out on different samples of different tyre sizes, all decorated on the outer side with coloured labels.

The test was carried out on an Indoor machine with a 1.7-metre diameter drum in a conditioned environment with a controlled temperature of 25° C. The tyre was inflated to a (controlled) pressure of 3 bar and was stressed with constant vertical load and constant speed. The following are the test conditions used:

| Tyre | Vertical load (kg) | Speed (km/h) |
| --- | --- | --- |
| 1 | 721 | 120 |
| 2 | 525 | 80 |
| 3 | 466 | 120 |

The test included stops for checking the tyres every 12 hours and continued until reaching 14400 km The labels used were made with the materials of the following table 7.

TABLE 7

| | Protective layer | Ink layer | Adhesive layer |
| --- | --- | --- | --- |
| Label 3 | XSIDE 01 | Nylontech PLT - white | T1 |
| Label 4 | XSIDE 01 | Nylontech PLT - yellow | T2 |
| Label 5 | XSIDE 01 | Nylontech PLT - yellow | T3 |
| Label 6 | XSIDE 01 | Nylontech PLT - white | T4 |

TABLE 7-continued

| | Protective layer | Ink layer | Adhesive layer |
| --- | --- | --- | --- |
| Label 7 | XSIDE 01 | Nylontech PLT - yellow | T5A |
| Label 8 | XSIDE 01 | Nylontech PLT - yellow | T5D |
| Label 9 | XSIDE 01 | Nylontech PLT - yellow | T5E |
| Label 10 | XSIDE 01 | — | BS TRANSFER 280/70 PA |
| Label 11 | XSIDE 01 | — | 5015TFF |
| Label 12 | XSIDE 01 | — | 5015TPI |
| Label 13 | XSIDE 03 | — | 5015TFF |
| Label 14 | XSIDE 03 | — | 5015TPI |
| Label 15 | XSIDE 01 | Nylontech PLT - white | 5015TPI |
| Label 16 | XSIDE 01 | Nylontech PLT - yellow | 5015TPI |
| Label 17 | XSIDE 01 | Nylontech PLT - yellow | 5015TFF |
| Label 18 | XSIDE 01 | Nylontech PLT - yellow | HYPERJOINT 9004 |

The labels 3-18 (in various shapes and sizes compatible with the sidewall of the tyre) were applied to the tyres 1-3 in the combinations and in the conditions shown in the following table 8, and subjected to high speed and fatigue tests. The following table 8 also shows the results of the tests expressed as follows:

High speed test:

A: Passed without any damage

B: Passed with some partial detachments

C: Passed with obvious detachments

Fatigue Test

A: Passed without any damage

B: Passed without detachment, with formation of bubbles

C: Passed with some partial detachments

D: Passed with obvious detachments

TABLE 8

| Tyre | Label | Application | High speed | Fatigue |
| --- | --- | --- | --- | --- |
| 1 | 3 | 1bar 140° C. 50" | A | A |
| 1 | 3 | 1bar 140° C. 35" | A | A |
| 1 | 4 | 1bar 140° C. 50" | B | — |
| 1 | 4 | 1bar 140° C. 35" | B | — |
| 1 | 5 | 1bar 140° C. 50" | A | — |
| 1 | 5 | 1bar 140° C. 35" | A | — |
| 1 | 6 | 1bar 140° C. 50" | A | — |
| 1 | 6 | 1bar 140° C. 35" | A | — |
| 2 | 5 | 1bar 140° C. 50" | A | — |
| 2 | 6 | 1bar 140° C. 50" | A | — |
| 3 | 7 | 1bar 140° C. 40" | A | — |
| 3 | 8 | 1bar 140° C. 40" | A | — |
| 3 | 9 | 1bar 140° C. 40" | A | — |
| 1 | 10 | 2bar 50° C. | — | A |
| 1 | 11 | 2bar 50° C. | — | A |
| 1 | 12 | 2bar 50° C. | — | B |
| 1 | 13 | 2bar 20° C. | — | A |
| 1 | 14 | 2bar 20° C.. | — | B |
| 1 | 15 | 2bar 20° C. | — | B |
| 2 | 16 | 2bar 70° C.12" | — | B |
| 2 | 17 | 2bar 70° C. 12" | — | A |
| 2 | 14 | 2bar 70° C. 12" | — | B |
| 3 | 17 | 2bar 70° C. 12" | A | — |
| 3 | 18 | 2bar 70° C. 12" | B | — |

Example 5

Endurance Tests on the Road

In view of the good results obtained and illustrated in example 4, tests were carried out with tyre engagement on the road.

The first test took place on a private circuit at an average speed of about 150 km/h. The test was performed with a Lamborghini Aventador equipped with the tyres 1 and 3 of example 4 on which labels of different composition as per table 9 were applied.

TABLE 9

| | Protective layer | Ink layer | Adhesive layer |
|---|---|---|---|
| Label I | XSIDE 01 | Nylontech PLT - yellow | 5015TFF |
| Label II | XSIDE 01 | Nylontech PLT - yellow | HYPERJOINT 9004 |
| Label III | XSIDE 01 | Nylontech PLT - yellow | T5A |
| Label IV | XSIDE 01 | Nylontech PLT - yellow | T5C |
| Label V | XSIDE 01 | Nylontech PLT - yellow | T5D |
| Label VI | XSIDE 01 | Nylontech PLT - yellow | T5E |
| Label VII | XSIDE 01 | Nylontech PLT - yellow | T5F |

Labels I and II were applied with a pressure of 2 bar at 70° C. for 12 seconds. Labels III-VII were applied with a pressure of 1 bar at 140° C. for 60 seconds.

The dimensions of the decoration elements in height are compatible with the radial dimensions of the sidewall ranging from 0.8 cm to 2.5 cm, while the longitudinal development of the same corresponds to an arc to which a chord of dimensions ranging from 5 cm to 20 cm is subtended.

Each tyre was decorated with a maximum number of elements equal to 10. A total of 10 tyres were tested, each of which exhibited mixed solutions in terms of label sizes and related types of adhesives.

The test allowed evaluating the systems under very high mechanical stress conditions (load, speed and cornering), which led to an increase in the final sidewall temperature up to about 60° C. (external ambient temperature 13° C.). The following table 10 summarises the results obtained expressed as follows:

3=No defect
2=Edge/application defects
1=Extended defects/detachments

TABLE 10

| | DIMENSIONS of labels (cm x cm) | | |
|---|---|---|---|
| Label | (1.5 x 13) | (0.8 x 23) | (1.2 x 5) |
| I. | 2 | 2 | 2 |
| II. | 3 | 3 | 3 |
| III. | 2 | 2 | 2 |
| IV. | 3 | 3 | 3 |
| V. | 3 | 3 | 3 |
| VI. | 3 | 2 | 3 |
| VII. | 3 | 3 | 2 |

All the results were considered positive in terms of adhesion: no label was detached and/or appeared damaged after the test cycle. The defects recorded were limited at the edges of the decorative elements and attributable to defects determined during the decoration step.

The second test took place on a private circuit with a distance of about 2000 km at an average speed of about 200 km/h.

The test was performed with a Porsche 991 S equipped with the Pzero 245/35ZR20 (91Y) tyres at the rear and Pzero 305 30ZR20 XL (103Y) at the front with labels of different composition as shown in table 11.

TABLE 11

| | Protective layer | Ink layer | Adhesive layer |
|---|---|---|---|
| Label VIII | XSIDE 01 | Nylontech PLT - yellow | 5005TFF |
| Label IX | XSIDE 01 | Nylontech PLT - yellow | T5C |
| Label X | XSIDE 01 | Nylontech PLT - yellow | T5F |

Labels VIII were applied with a pressure of 2 bar at 70° C. for 12 seconds. Labels IX-X were applied with a pressure of 1 bar at 140° C. for 40 seconds.

The dimensions of the decoration elements in height are compatible with the radial dimensions of the sidewall ranging from 0.8 cm to 2.5 cm, while the longitudinal development of the same corresponds to an arc to which a chord of dimensions ranging from 5 cm to 20 cm is subtended.

Each tyre was decorated with a maximum number of elements equal to 10. A total of 4 tyres were tested (2 front and 2 rear), each of which exhibited mixed solutions in terms of label sizes and related types of adhesives.

The test allowed evaluating the systems under very high mechanical stress conditions (load and speed), which led to an increase in the final sidewall temperature up to about 55° C. (external ambient temperature 20° C.). The following table 12 summarises the results obtained expressed as follows:

3=No defect
2=Edge/application defects
1=Extended defects/detachments

TABLE 12

| | DIMENSIONS of labels (cm x cm) | | |
|---|---|---|---|
| Label | (1.5 x 13) | (0.8 x 23) | (1.2 x 5) |
| VIII | 3 | 2 | 2 |
| IX. | 3 | 3 | 3 |
| X. | 3 | 2 | 3 |

All the results were considered positive in terms of adhesion: no label was detached and/or appeared damaged after the test cycle. The defects recorded were once again at the edges of the decorative elements and attributable to defects determined during the decoration step.

The third test was carried out on public roads and highways for a total distance of about 340 km with temperatures below 0° C. (from –3° C. to –18° C.) with included a 2 days parking break at –10° C.

The test was performed with a VW TOUAREG car equipped with Pirelli Scorpion™ Winter 265/45 R20 tyres on which labels with the composition as per table 13 were applied.

TABLE 13

| | Protective layer | Ink layer | Adhesive layer |
|---|---|---|---|
| Label XI | XSIDE 01 | Nylontech PLT - white | T1 (20 μm) |

Labels XI were applied with a pressure of 1 bar at 140° C. for 40 seconds. The following table 14 summarises the results obtained expressed as follows:
3=No defect
2=Edge/application defects
1=Extended defects/detachments

TABLE 14

| | DIMENSIONS of labels (cm x cm) | | |
|---|---|---|---|
| Label | (1.5 x 13) | (0.8 x 23) | (1.2 x 5) |
| XI. | 2 | 2 | 2 |

Following the engagement of the tyres during the journey, for the described labels it was possible to highlight a good seal of the label from the point of view of the surface film and the ink, and the absence of cracks or cracking along the thickness of the decorative element.

The invention claimed is:

1. A tyre for vehicle wheels comprising at least one carcass structure, a tread band applied in a position radially external to the carcass structure, and a pair of sidewalls applied laterally on the opposite sides with respect to the carcass structure, wherein a label is applied on at least one sidewall of the pair of sidewalls,
    the label comprising a single protective layer, an adhesive layer, and one or more ink layers interposed between the protective layer and the adhesive layer,
    wherein the adhesive layer adheres the label to the surface of the sidewall, wherein the protective layer comprises a polyester-based cross-linked aliphatic polyurethane, a polyether-based cross-linked aliphatic polyurethane, or both exhibiting dynamic elastic modulus values E', measured at 25° C., static tensile deformation 1%, dynamic deformation ±0.1%, and frequency 1 Hz, equal to or higher than about 5 MPa, and a residual deformation measured at 25° C. after 4 cycles of deformation from 0% to 12%, equal to or lower than about 1%, and
    wherein a thickness of the protective layer is in a range from 50 μm to 200 μm.

2. The tyre according to claim 1, wherein the polyester-based cross-linked aliphatic polyurethane, the polyether-based cross-linked aliphatic polyurethane, or both exhibit dynamic elastic modulus values equal to or lower than about 25 MPa.

3. The tyre according to claim 2, wherein the polyester-based cross-linked aliphatic polyurethane, the polyether-based cross-linked aliphatic polyurethane, or both exhibit dynamic elastic modulus values equal to or lower than about 20 MPa.

4. The tyre according to claim 1, wherein the polyester-based cross-linked aliphatic polyurethane, the polyether-based cross-linked aliphatic polyurethane, or both exhibit a residual deformation, measured at 25° C. after 4 cycles of deformation from 0% to 12%, equal to or lower than about 0.5%.

5. The tyre according to claim 1, wherein the protective layer is made of a transparent or coloured polyurethane film.

6. The tyre according to claim 5, wherein the coloured protective layer comprises an amount of pigment ranging from about 1% to 30% by weight, with respect to the overall weight of the protective layer.

7. The tyre according to claim 6, wherein the coloured protective layer comprises an amount of pigment ranging from 3% to 20% by weight, with respect to the overall weight of the protective layer.

8. The tyre according to claim 1, wherein the ink layer is printed on the protective layer by one or more of silk-screen, digital, flexographic, and pad printing.

9. The tyre according to claim 1, wherein a thickness of the ink layer is in a range from 1 μm to 100 μm.

10. The tyre according to claim 1, wherein the ink layer comprises polyurethane-based inks.

11. The tyre according to claim 1, wherein the adhesive layer comprises pressure sensitive adhesives (PSA) or thermally activatable adhesives (TA).

12. The tyre according to claim 11, wherein the adhesive layer comprises adhesives based on natural or synthetic rubber, acrylic adhesives, vinyl ether adhesives, silicone adhesives, urethane-based adhesives, and mixtures of two or more thereof.

13. The tyre according to claim 11, wherein the adhesive layer comprises adhesives with an adhesion force, measured according to the ISO 11339 standard at a temperature of 23° C. between two PET films, equal to or greater than 2N.

14. The tyre according to claim 11, wherein a thickness of the adhesive layer is in a range from 5 μm to 400 μm.

15. The tyre according to claim 1, wherein the pair of sidewalls is made with a non-staining cross-linkable elastomeric composition, comprising (i) at least one diene elastomeric polymer, and (ii) an ozone protection system.

16. The tyre according to claim 15, wherein the ozone protection system consists essentially of at least one phenolic antioxidant in an amount equal to or greater than 3 phr optionally in combination with at least one cyclic acetal or enol-ether antioxidant, in an amount equal to or greater than 1 phr.

17. The tyre according to claim 16, wherein the cyclic acetal or enol-ether antioxidant is selected from the group consisting of 3,9-di-3-cyclohexen-1-yl-2,4,6,10-tetraoxaspyro[5.5]undecane and cyclohexen-3-ylidenmethyl-benzylether.

18. The tyre according to claim 15, wherein the phenolic antioxidant is selected from the group consisting of pentaerythrityl tetrakis[3-(3,5-di-t-butyl-4-hydroxyphenyl)propionate]; 2,2-thio-diethylene bis-[(3-(3,5-di-t-butyl-4-hydroxyphenyl)propionate)]; octadecyl-3-(3,5-di-t-butyl-4-hydroxyphenyl)propionate; isooctyl-3-(3,5-di-t-butyl-4-hydroxy-phenyl)propionate; 1,3,5-trimethyl-2,4,6-tris(3,5-di-t-butyl-4-hydroxybenzyl)benzene; 4,6-bis(dodecylthiomethyl)-o-cresol; 4,6-bis(octylthiomethyl)-o-cresol; triethyleneglycol-bis[(3-(3-t-butyl-5-methyl-4-hydroxyphenyl) propionate)]; 1,6-hexanediol-bis[(3-(3,5-di-t-butyl)-4-hydroxyphenyl)propionate]; and 4-{[4,6-bis(octylsulfanil)-1,3,5-triazin-2-yl]amino}-2,6-di-t-butylphenol.

19. The tyre according to claim 1, wherein the thickness of the protective layer is in a range from 75 μm to 150 μm.

* * * * *